United States Patent
Arora et al.

(10) Patent No.: US 12,524,277 B2
(45) Date of Patent: Jan. 13, 2026

(54) AUTOMATED SYNCHRONIZATION OF NETWORK ADDRESSES ACROSS PUBLIC CLOUD ENVIRONMENTS

(71) Applicant: Salesforce, Inc., San Francisco, CA (US)

(72) Inventors: Anmol Arora, Vancouver (CA); Chaitanya Pemmaraju, San Francisco, CA (US); Nagaraja Shenoy, Bengaluru (IN)

(73) Assignee: Salesforce, Inc., San Francisco, CA (US)

( * ) Notice: Subject to any disclaimer, the term of this patent is extended or adjusted under 35 U.S.C. 154(b) by 444 days.

(21) Appl. No.: 17/992,809

(22) Filed: Nov. 22, 2022

(65) Prior Publication Data

US 2024/0168824 A1  May 23, 2024

(51) Int. Cl.
  *G06F 9/50* (2006.01)
(52) U.S. Cl.
  CPC .......... *G06F 9/5072* (2013.01); *G06F 9/5016* (2013.01); *G06F 9/505* (2013.01)
(58) Field of Classification Search
  CPC .................................................... G06F 9/5072
  See application file for complete search history.

(56) References Cited

U.S. PATENT DOCUMENTS

| | | | |
|---|---|---|---|
| 7,725,501 B1 | 5/2010 | Stillman et al. | |
| 2012/0136936 A1* | 5/2012 | Quintuna | G06F 21/6245 709/204 |
| 2018/0083835 A1 | 3/2018 | Cole et al. | |
| 2019/0103993 A1 | 4/2019 | Cidon et al. | |
| 2019/0349405 A1 | 11/2019 | Bengtson | |
| 2020/0213151 A1* | 7/2020 | Srivatsan | H04L 63/0281 |
| 2020/0228407 A1 | 7/2020 | Urmese et al. | |
| 2021/0035069 A1 | 2/2021 | Parikh | |
| 2021/0258788 A1* | 8/2021 | Bykampadi | H04L 67/02 |
| 2024/0098013 A1* | 3/2024 | Dorantes Loarca | H04L 45/02 |

OTHER PUBLICATIONS

United States Office Action, U.S. Appl. No. 17/397,772, filed May 31, 2023, 21 pages.
United States Office Action, U.S. Appl. No. 17/397,772, filed Jan. 6, 2023, 19 pages.

* cited by examiner

*Primary Examiner* — Charlie Sun
(74) *Attorney, Agent, or Firm* — Sterne, Kessler, Goldstein & Fox P.L.L.C.

(57) ABSTRACT

A system performs automated network address synchronization in a multi-cloud environment. The system instantiates a trusted public cloud environment (TPCE) based on a specification in a first public cloud environment (PCE). The TPCE offers a set of services. The system discovers a set of external network addresses (ENAs) associated with the set of services, and records the set of ENAs in a storage in the TPCE. The system synchronizes the set of ENAs with another set of ENAs associated with a set of services in another TPCE, causing the services in the two TPCEs to have access to both ENAs associated with services in the two TPCEs.

20 Claims, 7 Drawing Sheets

FIG. 6

AUTOMATED SYNCHRONIZATION OF NETWORK ADDRESSES ACROSS PUBLIC CLOUD ENVIRONMENTS

BACKGROUND

Field of Art

This disclosure generally relates to network address management in public cloud computing platforms (also referred to as "PCEs"), and in particular, to automated network address synchronization across trusted public cloud environments (also referred to as "TPCEs").

Description of the Related Art

Cloud computing platforms have become increasingly popular in providing software, platform, and infrastructure services. For instance, public cloud service providers may provide on-demand network access to compute resources, database storage, content delivery, and other services that may be used by entities.

Services executing with a public cloud environment may be provisioned for access through external network addresses (also referred to as "ENAs"), such as (but not limited to) external IP addresses (also referred to as "EIPs"). These EIPs needed to be stored and made available to consuming services. Conventionally, storing and publishing an external IP address (EIP) is performed by the owner of the service. However, this may pose problems, since there may be incomplete information stored regarding an EIP, outdated information associated with an EIP, and the service owners may inadvertently expose internal resources to entities on the Internet, thereby presenting security risks, etc.

Furthermore, EIPs of services hosted on different PCEs are stored separately on their corresponding PCEs. As such, a service hosted in a first PCE does not have access to EIPs of a service hosted in a second PCE.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral.

DETAILED DESCRIPTION

More and more entities, such as enterprises, are migrating to public cloud environments (PCEs). Examples of PCEs include, but are not limited to, Amazon Web Services™ (AWS™), Google PCE™ (GCP™), Azure™, etc. Customers of a public cloud environment may be producers offering a variety of services, as well as consumers of these services. In a modern public cloud environment (PCE), many new services/resources may be provisioned with public network addresses, such as external network addresses (ENAs). For example, an ENA may include or be an external IP address (EIP). These ENAs need to be stored and made available to consuming services. Conventionally, the published ENAs are only accessible to services in the same PCE. For example, ENAs collected and published in a first PCE are only available to services in the first PCE; and ENAs collected and published in a second PCE are only available to services in the second PCE. As such, services in the first PCE have no access to ENAs collected and published in the second PCE, vice versa.

Furthermore, it is often that storing and publishing an ENA is performed by the associated service owner (SO). As such, there may be incomplete information stored regarding an ENA, outdated information associated with an ENA, the SOs may inadvertently expose internal resources to entities on the Internet, thereby presenting security risks, etc.

Alternatively, ENAs (such as IP addresses) in use across the Internet may be collected by network crawlers deployed across the Internet. Such network crawling poses limitations, including acquiring a major portion (e.g., 80%) of the ENA information easily but needing to employ significant effort to obtain the remaining (e.g., 20%) ENA information due to connection issues, configuration issues, etc.

Principles described herein resolve the above-described issues by providing a service that automatically collects and synchronizes ENAs (such as EIPs) for services hosted on different PCEs separately.

In particular, embodiments described herein include a method for network address synchronization in a multi-cloud environment. The method may be performed by computing systems, such as a first computing system associated with a first PCE, and/or a second computing system associated with a second PCE.

The first computing system instantiates a first trusted public cloud environment (TPCE) based on a first specification in a first PCE. The first TPCE offers a first set of services. The computing system then discovers a first set of ENAs associated with the first set of services in the first TPCE, and records the first set of ENAs in a first storage in the first TPCE. In some embodiments, each ENA corresponds to an external IP address (EIP).

The first computing system then synchronizes the first set of ENAs with a second set of ENAs associated with a second set of services in a second TPCE in a second PCE, causing the first set of services in the first TPCE and the second set of services in the second TPCE to have access to both ENAs associated with the first set of services in the first TPCE and ENAs associated with the second set of services in the second TPCE.

On the other side, a second computing system instantiates a second TPCE based on a second specification in the second PCE. The second TPCE offers the second set of services. The second computing system discovers the second set of ENAs associated with the second set of services in the second TPCE, and records the second set of ENAs in the second storage in the second TPCE. The second computing system synchronizes the second set of ENAs with the first set of ENAs.

The first PCE and the second PCE may be different PCEs, such as (but not limited to) Amazon Web Services™ (AWS™), Google PCE™ (GCP™), Azure™, etc. Traditionally, the first TPCE in the first PCE or the second TPCE in the second PCE does not have access to the ENAs in the other PCE. The principles described herein solve this problem by implementing a serverless service and a network address translation (NAT) gateway to allow the two TPCEs in two different PCEs to communicate with each other, and therefore allow the ENAs in both TPCEs to be synchronized.

In some embodiments, synchronizing the first set of ENAs with the second set of ENAs includes an initial synchronization process. During the initial synchronization process, the first computing system transmits the first set of ENAs to the second TPCE, causing the first set of ENAs to be merged and stored with the second set of ENAs in the second storage in the second TPCE. The first computing system also receives the second set of ENAs from the second TPCE, and stores and merges the second set of ENAs with the first set of ENAs in the first storage in the first TPCE.

Similarly, on the other side, the second computing system transmits the second set of ENAs to the first TPCE, causing the second set of ENAs to be merged and stored with the first set of ENAs in the first storage in the first TPCE. The second computing system also receives the first set of ENAs from the first TPCE, and stores and merges the first set of ENAs with the second set of ENAs in the second storage in the second TPCE.

In some embodiments, after the initial synchronization, a subsequent synchronization is performed. In some embodiments, the subsequent synchronization may be the same as the initial synchronization, which transmits all the ENAs. Alternatively, the subsequent synchronization may be incremental, which only transmits changes made to the set of ENAs. In some embodiments, during a subsequent incremental synchronization, the first computing system monitors the first set of ENAs to detect changes. Responsive to detecting a change to the first set of ENAs, the first computing system transmits the change to the second TPCE, causing the second set of ENAs to be updated based on the change, such that the change made to the first set of ENAs is also made to the second set of ENAs.

Again, on the other side, the second computing system monitors the second set of ENAs to detect changes. Responsive to detecting a change to the second set of ENAs, the second computing system transmits the change to the first TPCE, causing the first set of ENAs to be updated based on the change, such that the change made to the second set of ENAs is also made to the first set of ENAs.

Overall System Environment

Figure 1:
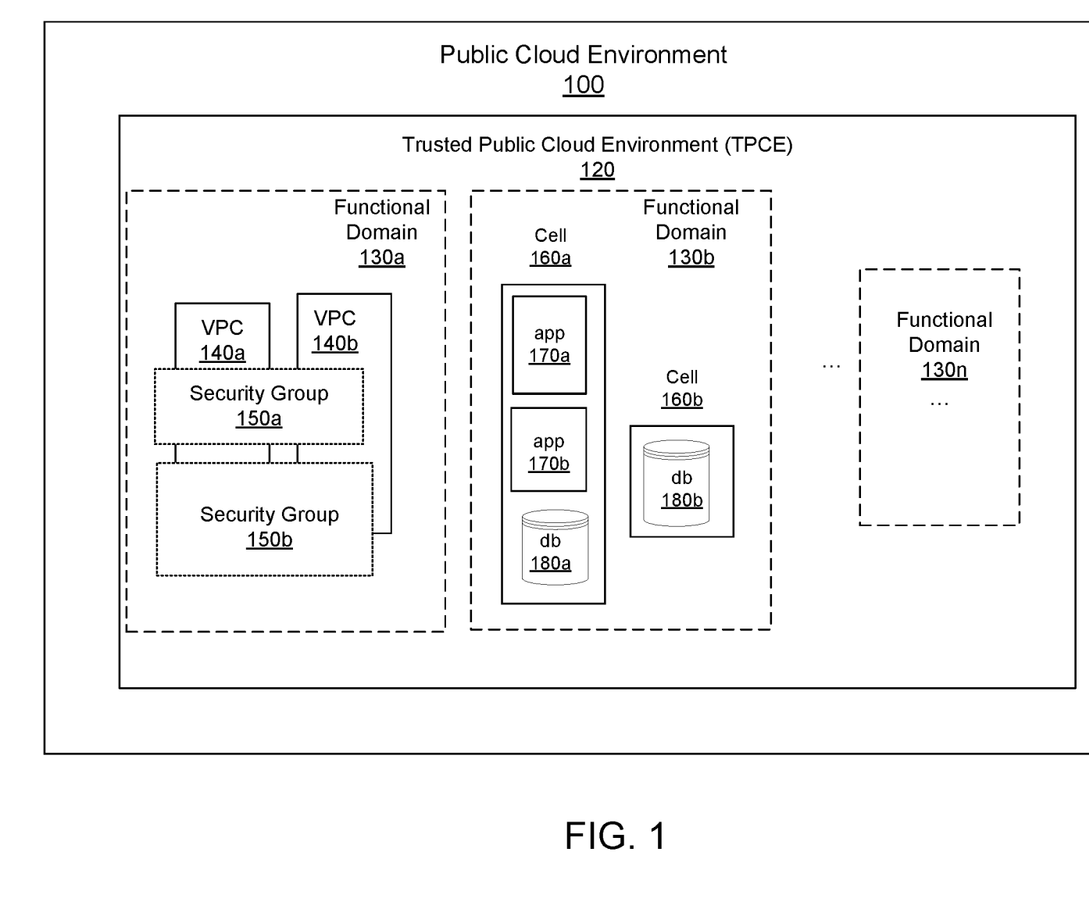
FIG. 1 depicts a block diagram illustrating functional blocks for a trusted public cloud environment that leverages a widely available public cloud environment, according to one embodiment.

FIG. 1 shows a block diagram illustrating a trusted public cloud environment (TPCE) 120 that leverages an available public cloud environment (PCE) 100, in accordance with one embodiment. Public cloud environments 100 are owned and operated by third-party providers, and the hardware, software, and supporting infrastructure are also owned and managed by the third-party cloud provider. Examples of public cloud environment 100 include, but are not limited to, Amazon Web Services™ (AWS™), Google PCE™ (GCP™), Azure™, etc.

A PCE 100 offers a range of public cloud computing infrastructure services 110 that may be used on demand by a TPCE 120. Examples of public cloud computing infrastructure services include servers, storage, databases, networking, security, load balancing, software, analytics, intelligence, and other infrastructure service functionalities. These infrastructure services may be used by the TPCE 120 to build, deploy, and manage applications in a scalable and secure manner. The TPCE 120 is a trusted public cloud architecture with processing resources, networking resources, storage resources, and other service functionalities with security boundaries that are strictly enforced. An example of a TPCE 120 is a data center with defined and strictly enforced security boundaries.

The TPCE 120 has specific attributes, in accordance with some embodiments. These attributes include attributes required to use available public cloud infrastructure services 110, for example region-specific attributes or environment type-specific attributes. Further attributes support security needs, availability expectations, architectural agility coupled with reliability, developer agility, distributed capabilities, and the ability to perform on multiple available PCEs.

The TPCE 120 may support multiple functional domains 130a, 130b, . . . , 130n. Each functional domain (FD) 130 represents a set of capabilities and features and services offered by one or more computing systems that can be built and delivered independently, in accordance with one embodiment. A functional domain 130 may also be viewed a set of cohesive technical use-case functionalities offered by one or more computing systems. A functional domain 130 has strictly enforced security boundaries. A functional domain 130 defines a scope for modifications. Thus, any modifications to an entity—such as a capability, feature, or service—offered by one or more computing systems within a functional domain 130 may propagate as needed or suitable to entities within the functional domain, but will not propagate to an entity residing outside the bounded definition of the functional domain 130. Although the term functional domain is used herein, the term may be replaced with service group representing a group of services that are specified and configured together in a data center configured in a PCE.

Each functional domain 130 may contain multiple virtual private cloud (VPC) networks, 140a, 140b, . . . , etc. Each virtual private cloud 140 is an on-demand pool of shared resources that are allocated within the functional domain 130 and provide a level of isolation between the users using the resources. Each functional domain 130 may also contain multiple security groups, 150a, 150b, . . . , etc. Each security group 150 represents a declarative model for enforcing network segmentation. Each security group 150 includes entities with similar risk service profiles collected into a single security group with explicit declarative policy brokering connectivity between the groups.

A functional domain 130 may also contain one or more cells, 160, 160b, . . . , etc. A cell 160 represents a collection of services that scale together, and that may be sharded. These services may be applications 170a, 170b, . . . , etc., and/or databases 180a, 180b, . . . , etc.

Figure 2:
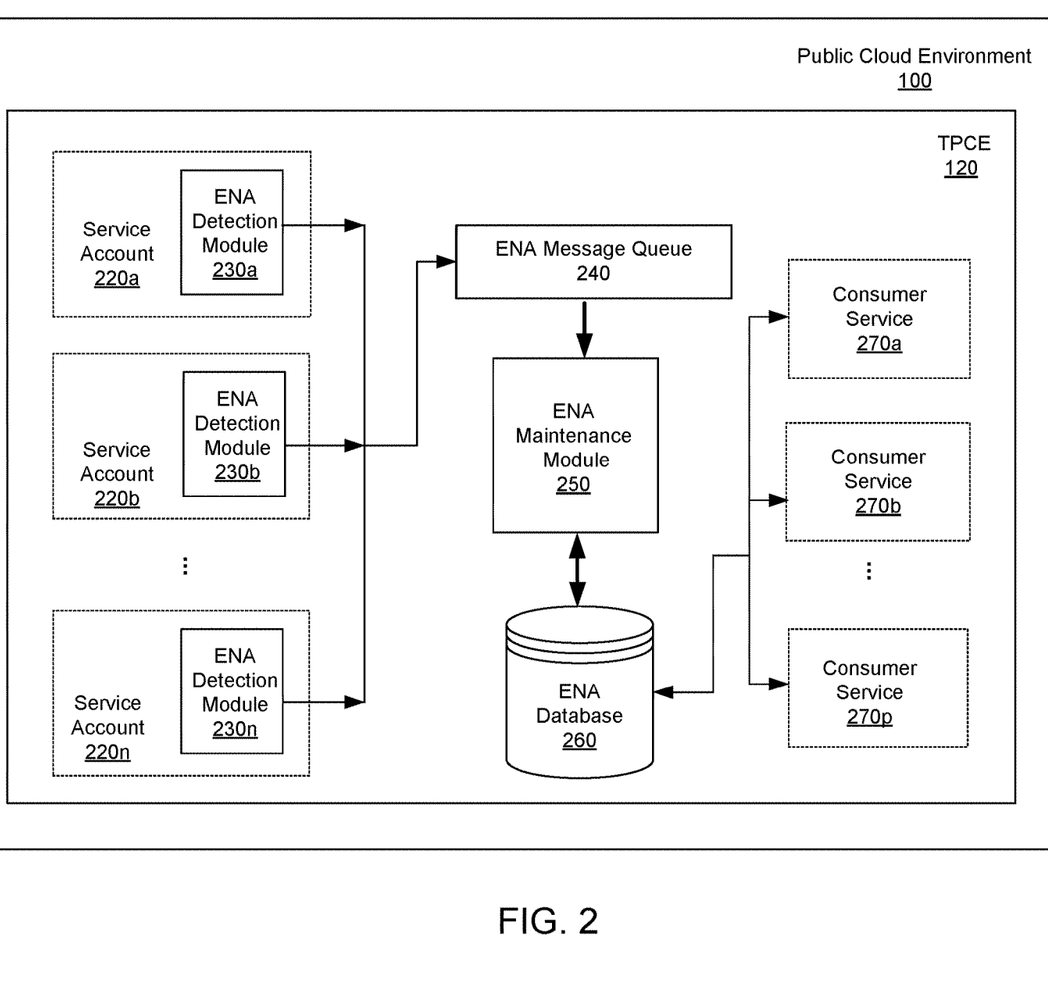
FIG. 2 shows a system configuration illustrating automated external network address (ENA) detection and central ENA maintenance and storage in a trusted public cloud environment, according to one embodiment.

In embodiments described herein, within each functional domain 130, the individual service applications 170a, 170b, . . . , etc., may be each individually monitored by an instance of an ENA detection process (such as described with respect to FIG. 2). The ENA detection process may execute an event-driven process within each service account (not shown) that resides in functional domain 130, where each service account may be associated with one or more executing service applications 170. In some embodiments, the ENA detection process monitors API calls within each individual service account (such as a service account associated with service application 170a) for ENA-related event occurrences.

In some embodiments described herein, the TPCE 120 may also have a central object storage for maintenance of ENA-related data that is gathered by various instances of the ENA detection processes executing with the environment. An ENA maintenance process (such as described in FIG. 2) executing within the TPCE 120 may perform actions that ensure that updated information in association with various ENAs of services executing in the TPCE 120 are stored in the central data storage and available for access by consuming services in the TPCE 120.

An Example ENA Detection and Maintenance System

FIG. 2 depicts an example of an ENA detection and maintenance system, in accordance with one embodiment. The example shown in FIG. 2 may be performed in a TPCE such as TPCE 120 that resides within a PCE such as PCE 100 depicted in FIG. 1. FIG. 2 depicts operational functionalities of instances of ENA detection modules 230 and a central ENA maintenance module 250.

A service account 220 may have a service application that is offering a service for use by a consumer. Each service account 220 (220a, 220b . . . 220n) may reside in one or more functional domains (such as functional domain 130 in FIG. 1) of the TPCE 120. Each service application in a service account 220 may be provisioned with an ENA, e.g., an EIP. Each service account 220 may interface with other interacting entities (such as consumer services, etc.) using application programming interfaces (APIs). When a service application in a service account 220 is provisioned with an ENA, the provisioning causes an event to be triggered in association with the API of the service application in the service account 220.

In some embodiments, each API of a service application in a service account 220 is monitored by an ENA detection module 230. Thus, the ENA detection modules 230 are deployed at each of the service accounts, and there may be individual instances of ENA detection modules 230 (i.e., 230a, 230b, . . . , 230n) monitoring corresponding individual APIs of service accounts 220 (i.e., 220a, 220b, . . . , 220n). In some embodiments, the instances of the ENA detection modules 230 executed in individual service accounts leverage native public cloud functionalities. For example, when the PCE 100 is AWS™, an AWS™ lambda function may be implemented within a particular service account as an instance of the ENA detection module 230. As another example, when the PCE 100 is GCP™, Google™ Cloud Functions may be used to implement the ENA detection modules 230.

In some embodiments, responsive to detecting the occurrence of an ENA-related event in a monitored API, the ENA detection module 230 performs one or more lookup actions in association with the triggering ENA-related event, and extracts information in association with the ENA. The extracted information may be, for example, an ENA address value as well as metadata associated with the ENA, such as a service name, an environment in which the service resides, timestamp, etc. The ENA detection module 230 generates a data structure with the ENA address value and the metadata associated with the ENA. Subsequently, the ENA detection module 230 will provide a message with the generated data structure to a message queue service for posting within an ENA message queue 240. The ENA message queue 240 is associated with information regarding external IP addresses of services offered within the TPCE. This information regarding external IP addresses of services offered within the TPCE may be subsequently used for enforcing security and access control policies with respect to the service in the TPCE In some embodiments, the ENA maintenance module 250 is deployed within a main central location in the TPCE 120. The ENA maintenance process executes in conjunction with the ENA message queue 240 and a central ENA data store 260 that stores information in association with ENAs. The ENA maintenance module 250 monitors the ENA message queue 240 for new messages within the queue 240. When a new message is detected in the ENA message queue 240, the ENA maintenance module 250 processes the detected new message to extract a data structure associated with an ENA of a service offered within the TPCE. The ENA maintenance module 250 processes the extracted data structure and identifies an action to be performed to an entry in an ENA database 260. The ENA maintenance module 250 subsequently updates the entry in the ENA database 260 based on the identified action.

In some embodiments, the ENA database 260 stores data in association with ENAs. Entries in the ENA database may be associated with allocation identifiers, association identifiers, functional domains, and services executing in the TPCE. The entries associated with a service may have entries for the address value of ENA, a name for the service, a functional domain in which the service executes, timestamps, an allocation identifier and an association identifier associated with the service. The entry in the ENA database 260 that is in association with the ENA is updated based on the action that is identified by the ENA maintenance module 250. In some embodiments, the ENA database 260 is a central database that may be securely located within a TPCE 120 that is within any one of the PCEs 100 (e.g., Amazon Web Services™ (AWS™), Google PCE™ (GCP™), Azure™, etc.). The ENA database 260 provides updated information in association with the stored ENAs to any consumer services 270 (e.g., 270a, 270b, . . . , 270n) in the TPCE 120 that may require access to services deployed within the environment 120. This provided information may be used for enforcing security and access control policies with respect to the service in the TPCE. In some embodiments, service owners of service applications may be able to view the contents of the ENA database 260, including querying the ENA database 260 about ENAs assigned to a service, and ENAs that have been provisioned and listed against their services. In some embodiments, consumer services that are located outside of the TPCE 120 (e.g., consumer services that are located within a TPCE for a different PCE than PCE 100) may be able to retrieve updated information in association with the stored ENAs in the ENA database 260.

Example Architecture of ENA Detection and Maintenance System

Figure 3:
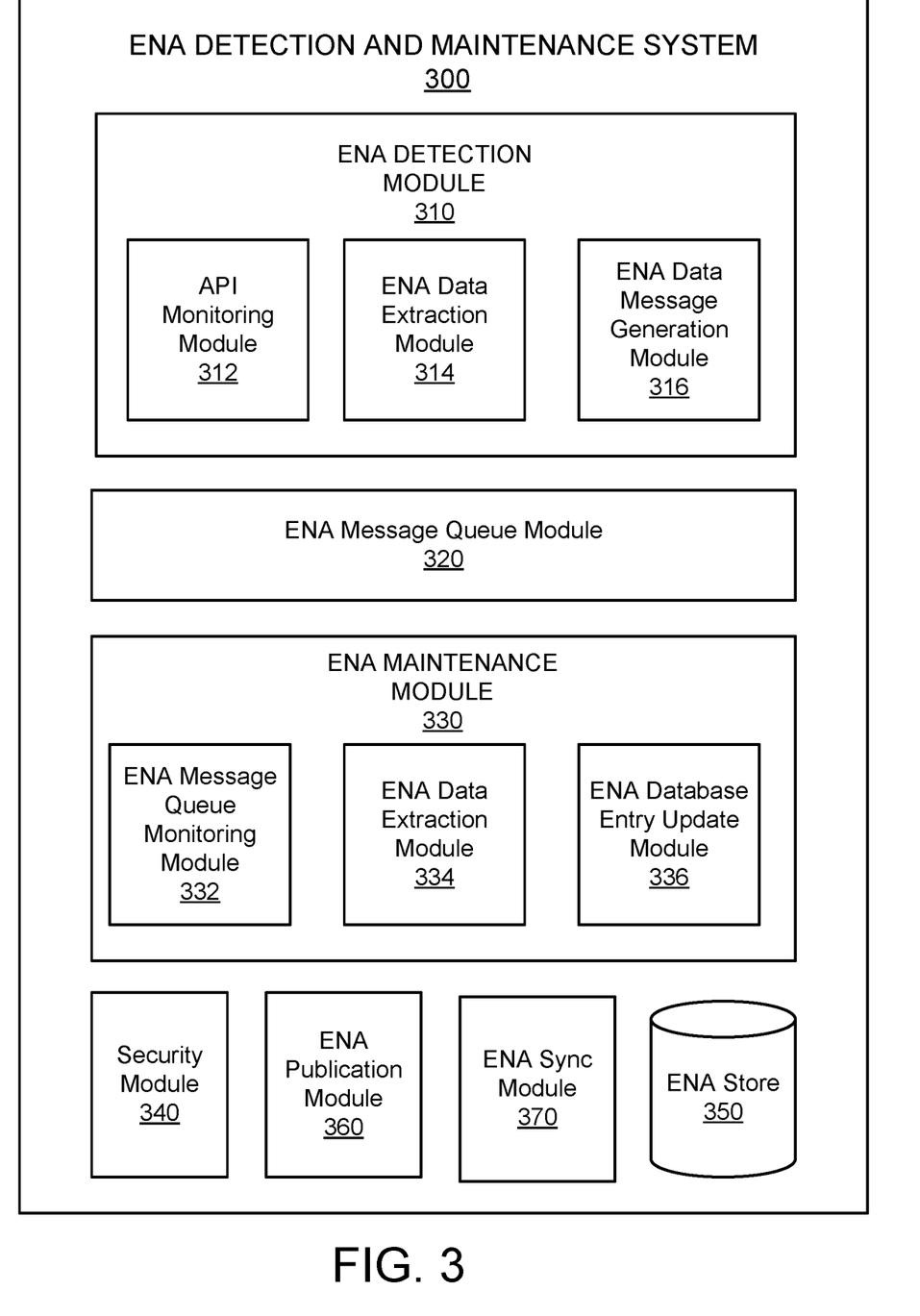
FIG. 3 is a block diagram illustrating components of an ENA detection and maintenance system in a trusted public cloud environment, according to one embodiment.

FIG. 3 is a block diagram illustrating an example architecture of an ENA detection and maintenance system 300, according to one embodiment. The ENA detection and maintenance system 300 may be implemented in a TPCE (such as TPCE 120), and/or a PCE (such as PCE 100). When the ENA detection and maintenance system 300 is implemented in TPCE 120, some of its components may correspond to ENA detection module 230, ENA message queue 240, ENA maintenance module 250, and/or ENA database 260 of FIG. 2.

The ENA detection and maintenance system 300 includes an ENA detection module 310, an ENA message queue module 320, an ENA maintenance module 330, a security module 340, a data store 350, an ENA publication module 360, and an ENA sync module 370. Alternative configurations of the ENA detection and maintenance system 300 may include different and/or additional modules. Functionality that is indicated as being performed by a particular module may be performed by other modules than those indicated herein. Furthermore, steps of any processes described herein can be performed in an order different from that illustrated herein.

The modules of ENA detection and maintenance system 300 may execute in a TPCE such as a TPCE 120 that resides within a PCE (such as PCE 100 depicted in FIG. 1). The ENA detection module 310 may deploy individual instances of the ENA detection modules 230 to execute within functional domains in conjunction with the security module 330, while the ENA maintenance module 320 may execute in a central location in conjunction with the security module 330 and the data store 350.

In some embodiments, the ENA detection module 310 deploys instances of the ENA detection modules 230 to execute in individual service accounts, such as service accounts 220 in FIG. 2, by leveraging native public cloud functionalities. For example, an AWS™ lambda function or Google™ Cloud Functions may be implemented within a particular service account as an instance of the ENA detection module 310. The term "ENA detection module" is used synonymously with the terms "instance of an ENA detection module," "ENA detection process" and "instance of an ENA detection process" herein.

In some embodiments, the ENA detection module 310 may include an API monitoring module 312, an ENA data extraction module 314 and an ENA data message generation module 316. Alternative configurations of the ENA detection module 310 may include different and/or additional modules, with functionalities indicated as being performed by a particular module being performed by other modules than those indicated herein. Furthermore, steps of any processes described herein can be performed in an order different from that illustrated herein.

The API monitoring module 312 monitors API calls associated with the service application, and triggers on detecting the occurrence of specific ENA-related events in the monitored API calls. In some embodiments, the triggering events may be API calls that are directed to any of the following events: associate an ENA, disassociate an ENA, create a network address translation (NAT) gateway, delete a NAT gateway, release an ENA, create a virtual private network (VPN) connection, and delete a VPN connection. Other embodiments of the ENA detection module 310 may be configured to trigger on other ENA-related events. In some embodiments, the API monitoring module may also periodically scan all service accounts for any ENA related information that have not been previously reported or that are missed by the API call monitoring.

The ENA data extraction module 314 extracts information regarding a specific ENA and metadata associated with the ENA. When the API monitoring module 312 indicates the occurrence of one of the specific ENA-related events in a monitored API call, the triggering event invokes the ENA data extraction module 314. In some embodiments, the module 314 that is executing in a service account may issue one or more API calls against the PCE, such as PCE 100 depicted in FIG. 1, to obtain ENA related information associated with the triggering event. The ENA related information may include: the ENA address, service application details (such as service name, functional domain in which the service application executes, timestamp, etc.), and the triggering event action details such as: "associate", "disassociate", "create NAT gateway", "delete NAT gateway", and "release". In some embodiments, the service application details may be looked up from mandatory tags associated with the PCE 100.

The ENA data message generation module 316 receives the extracted ENA-related information associated with the triggering event. The module 316 packages the extracted ENA-related information into a data format that is appropriate for providing to a message queuing service for posting in a message queue within the TPCE. For each of the identified actions in the triggering event, the ENA data message generation module 316 performs a set of actions. Note that in the actions, the allocation identifier refers to the PCE identifier, while the association identifiers refer to associations between the ENA and the resource that the ENA is associated with. The actions are briefly described as follows: (1) When the identified action is "associate" the module 316 extracts the allocation identifier and the association identifier from the message and generates a data structure as described below. (2) When the identified action is "disassociate" the module 316 extracts the association identifier from the message, and generates a data structure as described below. (3) When the identified action is "create NAT gateway" the module 316 extracts the allocation identifier and the NAT gateway identifier from the message, and generates a data structure as described below. (4) When the identified action is "delete NAT gateway" the module 316 extracts the NAT gateway identifier from the message and generates a data structure as described below. (5) When the identified action is "release" the module 316 extracts the allocation identifier from the message and generates a data structure as described below.

In some embodiments, the ENA data message generation module 316 packages the ENA-specific details into a JSON data structure to adhere to a pre-specified JSON schema for posting to as an ENA message to an ENA message queue. An example of an ENA message as a JSON block including ENA metadata as an ip_metadata sub-block is shown below:

```
{
  "name": "name-dev1-uswest2-abcdef-testingdemo",
  "TPCE_provider": {
    "region": "us-west-2",
    "substrate": "aws"
  },
  "environment": "dev1",
  "public_ips": {
    "services": [{
      "service_name": "testingdemo",
      "cidr": [
        "1.2.3.4/32",
      ],
      "ip_metadata": [
        { "ip_address": "1.2.3.4/32",
          "allocation_id": "ENA Allocation ID",
          #<IDs will be linked substrate flag above>
          "association_id": "ENA Association ID",
          #<association id will show that IP is in service>
          "timestamp": ""
```

```
        },
    ],
    "resource_type": "natgw",
    "tags": [
        { "key": "key1",
            "value": "value1"
        },{
            "key": "key2",
            "value": "value2"
        }
    ]
 }],
    "functional_domain_name": "abcdef",
    "functional_domain_type": "abcdef"
},
"TPCE_instance": "dev1-uswest2",
"grid": "",
"ENADetection_And_Maintenance_action": "add" | "delete"
}
```

The ENA data message generation module 316 connects to the ENA message queue module 320 and provides the ENA message for posting to the ENA message queue. The posted ENA message includes the packaged ENA details in the created JSON data structure such as the example shown above.

In some embodiments, prior to connecting to ENA message queue module 320, the ENA data message generation module 316 may need to acquire pre-specified security-related permissions within the TPCE. In some embodiments, the ENA data message generation module 316 may need to explicitly request permission from the security module 330 for acquiring security-related permissions prior to connecting to the ENA message queue module 320. In some embodiments, the security-related permissions acquired by the module 316 may automatically provide permissions for encrypting the ENA message prior to posting. In some embodiments, the ENA data message generation module 316 may need to acquire explicit permission for encrypting the ENA message. Once the ENA data message generation module 316 acquires the required permissions the security module 330, the module 316 may retrieve encryption related parameters from the data store 350, encrypt the generated ENA message, and then connect to the ENA message queue module 320 for posting the ENA message.

The ENA message queue module 320 manages the ENA message queue (such as the ENA Message Queue 240 depicted in FIG. 2). The module 320 may be located inside a service account that includes the ENA maintenance module 330. In some embodiments, the ENA message queue module 320 may configure the ENA message queue as a FIFO queue. In some embodiments, the contents of the ENA message queue may be encrypted, and access to the contents of the queue may be permitted only to entities with pre-specified security clearance levels. The ENA message queue module 320 may receive a request from the ENA data message generation module 316 regarding posting a new ENA message. The module 320 will store the message in the ENA message queue. In some embodiments, the module 320 will send an acknowledgement to the ENA data message generation module 316 to indicate successful posting of the new ENA message in the ENA message queue.

The ENA maintenance module 330 is deployed within a main central location in the TPCE 120. The ENA maintenance module 330 operates in conjunction with the ENA message queue module 320 and a central ENA database 260 (shown in FIG. 2). In some embodiments, the ENA maintenance module 330 is configured by leveraging native public cloud functionalities. For example, an AWS™ lambda function may be configured to execute the functionalities of the deployed ENA maintenance module 330. In some embodiments, the ENA maintenance module 330 may include an ENA message queue monitoring module 332, an ENA data extraction module 334, and an ENA database entry update module 336. Alternative configurations of the ENA maintenance module 330 may include different and/or additional modules, with functionalities indicated as being performed by a particular module being performed by other modules than those indicated herein. Furthermore, steps of any processes described herein can be performed in an order different from that illustrated herein.

The ENA message queue monitoring module 332 monitors the ENA message queue for new messages. The ENA message queue monitoring module 332 is configured to trigger on detecting a new ENA message in the ENA message queue. In some embodiments, upon detecting the new ENA message, the ENA message queue monitoring module 332 may send an indication of the detected new message to the ENA data extraction module 334.

The ENA data extraction module 334 processes a new message in the ENA message queue to extract a data structure that is associated with an ENA of a service offered in the TPCE. The extracted data includes the ENA-related information including: the ENA address, service application details (such as service name, functional domain in which the service application executes, timestamp, etc.), and ENA-related action details such as: "add" (an add operation), "delete" (a delete operation), "associate" (an associate operation), and "disassociate" (a disassociate operation). In some embodiments, the extracted data structure may be a JSON data structure that adheres to a pre-specified JSON schema, such as the JSON block including ENA metadata as an ip_metadata sub-block shown with respect to the ENA data message generation module 316.

The ENA database entry update module 336 processes the extracted data structure to identify the ENA, ENA metadata, and an associated action. The identified action is performed with respect to an entry related to the ENA in a centrally located ENA database (such as the ENA database 260 in FIG. 2). The actions that are identified by the ENA database entry module 336 based on processing the data structure include one of following: "add", "delete", "associate", and "disassociate". For each of these identified actions, the ENA database entry module 336 performs a set of actions with respect to the corresponding ENA entry in the ENA database. Briefly, the actions are as follows: (1) If the functional domain (or any group of services defined for a data center configured on a PCE) containing the service does not exist in as part of the current TPCE entries in the ENA database, it is added. (2) If this service does not exist as part of the current TPCE entries in the ENA database, it is added. (3) If the service exists but there are any new addresses, these new addresses are added. (4) If the service exists but the related ENA addresses have changed (some/all from the current ENA database entry are not in the new details) the old addresses are replaced with the new addresses. These sets of actions are described in more detail below.

In some embodiments, the ENA database entry update module 336 identifies an "add" action. The extracted information includes the ENA metadata, the functional domain, and the service name. The "add" action is performed to add the service and associated functional domain to the ENA database entry, if it does not already exist. The actions include the following: When the functional domain information does not exist in the ENA database, a new entry for the functional domain is added to the ENA database. An entry for the service and service-related metadata (e.g., ENA address, service name, ENA metadata, etc.) are added in association with the functional domain. When the functional domain has an entry in the ENA database, it is determined if the service name exists in the ENA database under the functional domain. If the name exists, the ENA metadata in the extracted data structure is added to the service's ENA metadata in the entry. If the name does not exist, a new entry is created for the service under the functional domain, and the metadata (e.g., service name, tags, ENA metadata, etc.) are added in the new entry.

In some embodiments, the ENA database entry update module 336 identifies an "delete" action. The extracted information includes the allocation identifier. The "delete" actions performed by the module 336 include the following: When it is determined that the allocation identifier exists for any ENA metadata in the ENA database across all functional domains and services, the ENA metadata entry for the given allocation identifier is deleted. Subsequently, if the service has no ENAs listed in its cidr (classless inter-domain routing) list and no ENA metadata entries, the service entry is removed from the functional domain. Subsequently, if the functional domain does not have any services in it, the entry for the functional domain is deleted from the ENA database. Finally, a clean up function is executed to purge ENAs from the service's CIDR list that do not have a corresponding ENA metadata entry. This clean up action is also executed when it is determined that the allocation identifier in the extracted data structure does not exist for any ENA metadata in the ENA database across all functional domains and services.

In some embodiments, the ENA database entry update module 336 identifies an "associate" action. The extracted information includes an allocation identifier and an association identifier. The "associate" actions performed by the module 336 include the following: the "add" actions described above are executed that adds the functional domain, service to the ENA database if the entry does not already exist. Subsequently the ENA address for the association event is added to the service's cidr list.

In some embodiments, the ENA database entry update module 336 identifies an "disassociate" action. The extracted information includes an association identifier. The "disassociate" actions performed by the module 336 include the following: Based on the association identifier, the ENA metadata entry in the ENA database is searched across all functional domains and services, and the ENA address (referenced in the ENA metadata from the service's CIDR) is deleted.

In some embodiments, when the ENA database entry update module 336 identifies actions such as "create NAT gateway" and "delete NAT gateway" action, these actions are recorded as metadata against the IP address in the ENA database. This ensures that correct removal of the IP addresses from the database when the "disassociate", "delete", or "release" events are detected.

In some embodiments, instead of a dedicated ENA database, a centrally located object storage (e.g., an S3 bucket in AWS™) may store an ENA list file. In such embodiments, upon identifying the ENA and the associated action, the ENA database entry update module 336 downloads the ENA list file, and perform the actions mentioned with respect to the ENA database entry instead on the entry corresponding to the ENA in the ENA list. After the actions are completed, the modified ENA list file is saved back in the centrally located object storage.

The security module 340 ensures that only the trusted/authenticated ENA data message generation modules 316 connect to the ENA message queue module 320 for posting a message. The security module may perform explicit authentication of module 316. In some embodiments, the authentication of the module may automatically provide a limited set of permission, such as permission for encrypting the ENA message prior to connecting with the module 320 for posting to the ENA message queue. The security module 340 may also ensure that only a trusted/authenticated ENA database entry update module 336 performs updates to the ENA database or the ENA list files. The security module 340 may also connect back to a service account, such as service account 220 in FIG. 2 to verify any received ENA information.

The data store 350 stores information for the ENA detection and maintenance system 300. The stored data may in association with configuring the various modules of the ENA detection and maintenance system 300 for operational functionalities such as described above. The stored data may also include encryption and decryption parameters as well as data keys associated with posting and accessing ENA messages in the ENA message queue. The data store 350 is a memory, such as a read only memory (ROM), dynamic random-access memory (DRAM), static random-access memory (SRAM), or some combination thereof. In some embodiments, the various modules of the ENA detection and maintenance system 300 may pass various data values directly to each other. In some embodiments, the various modules of the ENA detection and maintenance system 300 may store data values in the data store 350 and retrieve data values as needed from the data store 350.

The ENA publication module 360 publishes the ENAs stored in ENA store 350 to at least some services 270 hosted in the PCE 100, such that the those service 270 have access to the ENA stored in the ENA store 350. The ENA sync module 370 synchronizes ENAs stored in ENA store 350 with another ENA store (not shown) of another PCE (not shown), which may reside in a same or a different PCE, such as (but not limited to) Amazon Web Services™ (AWS™), Google PCE™ (GCP™), Azure™, etc. Additional details associated with the ENA syn module 370 are further discussed below with respect to FIGS. 4, 5A, and 5B.

Example ENA Synchronization Environment

Figure 4:
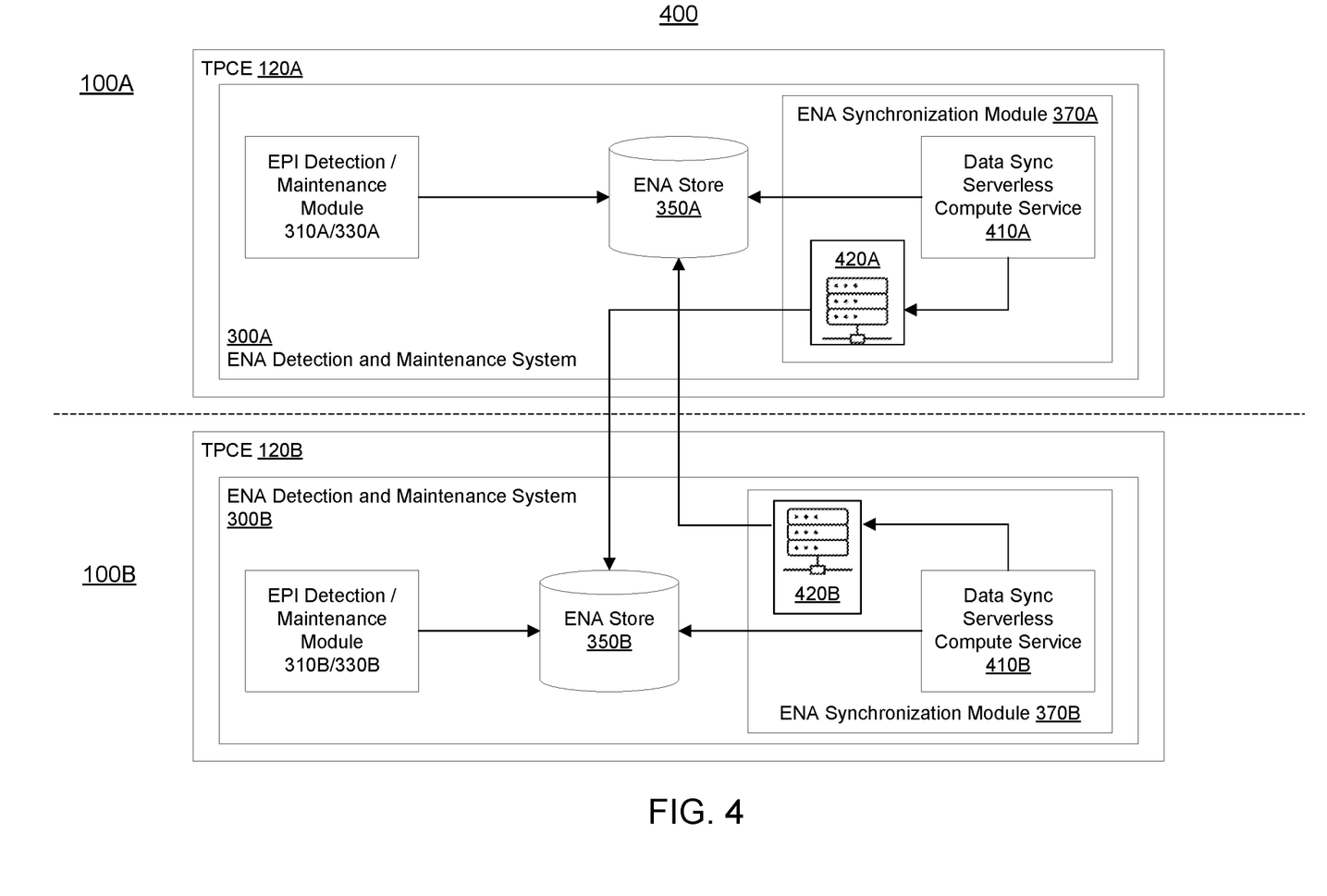
FIG. 4 is a block diagram illustrating an example environment in which the synchronization of ENAs across different public cloud environments (PCEs) may occur, according to one embodiment.

FIG. 4 illustrates an example environment 400, in which ENA synchronization process may occur. As illustrated in FIG. 4, the environment 400 includes a first TPCE 120a in a first PCE 100A, and a second TPCE 120B in a second PCE 100B. The first PCE 100A and the second PCE 100B may be two different PCEs, such as (but not limited to) Amazon Web Services™ (AWS™), Google Cloud Platform™ (GCP™), Azure™, etc.

Each of the first PCE 100A or second PCE 100B may correspond to the PCE 100 of FIG. 1 or 2. Each of the first TPCE 120A or the second TPCE 120B may correspond to the TPCE 120 of FIG. 2. The first TPCE 120A may be configured to provide a first set of services, and the second TPCE 120B may be configured to provide a second set of services. The first TPCE 120A includes a first ENA detection and maintenance system 300A, and the second TPCE 120B includes a second ENA detection and maintenance system 300B. Each of the first and second ENA detection and maintenance systems 300A and 300B corresponds to the ENA detection and maintenance system 300 of FIG. 3.

In particular, the first ENA detection and maintenance system 300A includes a first ENA detection module 310A, a first ENA maintenance module 330A, a first ENA store 350A, and a first ENA synchronization module 370A. The first ENA detection module 310A and the first ENA maintenance module 330A are configured to detect new ENAs or modified ENAs in the first TPCE 120A, and cause the detected new or modified ENAs to be stored in the first ENA store 350A. Similarly, the second ENA detection and maintenance system 300A includes a second ENA detection module 310A, a second ENA maintenance module 330A, a second ENA store 350A, and a second ENA synchronization module 370A. The second ENA detection module 310B and the second ENA maintenance module 330B are configured to detect new ENAs or modified ENAs in the second TPCE 120B, and cause the detected new or modified ENAs to be stored in the second ENA store 350A.

Further, the first ENA synchronization module 370A and the second ENA synchronization module 370B are configured to synchronize the ENAs stored in the first ENA store 350A and the ENAs stored in the second ENA store 350B. In some embodiments, each of the first and second ENA synchronization module 370A and 370B includes a data sync serverless compute service 410A or 410B and an NAT gateway 420A or 420B. The data sync serverless compute service 410A or 410B causes the NAT gateway 420A or 420B to transmit updated ENAs to the other PCEs 100B and 100A and PCEs 100B and 100A.

In particular, the first ENA synchronization module 370A includes a first data sync serverless compute service 410A and a first NAT gateway 420A. The first data sync serverless compute service 410A identifies and obtains updated ENAs in the first ENA store 350A, and causes the first NAT gateway 420A to transmit the ENAs stored in the first ENA store 350A or updates thereof to the second ENA store 350B. Similarly, the second ENA synchronization module 370B includes a second data sync serverless compute service 410B and a second NAT gateway 420B. The second data sync serverless compute service 410B identifies and obtains updated ENAs in the second ENA store 350B, and causes the second NAT gateway 420B to transmit the ENA stored in the second ENA store 350B or updates thereof to the first ENA store 350A.

In some embodiments, the first or second data sync serverless compute service 410A or 410B is configured to detect the ENAs stored in the corresponding first or second ENA store 350A or 350B have changed. Responsive to detecting the change, first or second data sync serverless compute service 410A or 410B causes the corresponding NAT gateway 420A or 420B to transmit the changed ENAs to the other ENA store 350B or 350A.

In some embodiments, the first or second data sync serverless compute service 410A or 410B is configured to periodically determine whether the ENAs stored in the corresponding first or second ENA store 350A or 350B have changed. In some embodiments, the first or second data sync serverless compute service 410A or 410B is configured to communicate with the ENA detection module 310A or 310B, and/or the ENA maintenance module 330A or 330B. When the ENA detection module 310A or 310B detects a new service, the ENA detection module 310A or 310B causes the data sync serverless compute service 410A or 410B to synchronize ENAs. When the ENA maintenance module 330A or 330B detects a modification of an ENA of an existing service, the ENA maintenance module 330A or 330B may also causes the data sync serverless compute service 410A or 410B to synchronize ENAs.

In some embodiments, the ENA detection maintenance module 310A or 310B, or the ENA maintenance module 330A or 330B are configured to detect one of a plurality of events, such as (but not limited to): (1) creation of a new service associated with a new ENA, (2) association of a new ENA with an existing service, (3) deletion of an existing service associated with an existing ENA, (4) disassociation of an existing ENA from an existing service, (5) creation of a network address translation (NAT) gateway associated with an ENA, (6) deletion of an NAT gateway associated with an existing ENA, (7) creation of a virtual private network (VPN) connection, and (8) deletion of a VPN connection.

In some embodiments, synchronizing the ENAs in the first and second storage 350A and 350B includes responsive to detecting a creation of a new service associated with a new ENA in the first PCE 110A, adding the new ENA to the first ENA store 350A. Responsive to adding the new ENA in the first ENA store 350A, the data sync serverless compute service 410 causes the new ENA to be added to the second ENA store 350B.

In some embodiments, synchronizing the ENAs stored in the first and second ENA stores includes responsive to detecting deletion of an existing service associated with an existing ENA in the first TPCE 120A, deleting the existing ENA from the first ENA store 350A. Responsive to deleting the existing ENA from the first ENA store 350B, the data sync serverless compute service 410 causes the existing ENA to be deleted from the second ENA store 350B.

In some embodiments, synchronizing the ENAs in the first and second ENA stores 350A and 350B includes responsive to detecting an association of a new ENA with an existing service associated with an existing ENA in the first TPCE 120A, replacing the existing ENA with the new ENA in the first ENA store 350A. Responsive to replacing the existing ENA with the new ENA in the first ENA store 350A, the data sync serverless compute service 410A causes the existing ENA in the second ENA store to be replaced with the new ENA.

In some embodiments, the first ENA detection and maintenance system 300A publishes all the ENAs stored in the first ENA store 350A, such that all the services provided in the first TPCE 120A have access to the ENAs stored in the first ENA store 350A; and the second ENA detection and maintenance system 300B publishes all the ENAs stored in the second ENA store 350B, such that all the services provided in the second TPCE 120B have access to the ENAs stored in the second ENA store 350B.

Since the ENAs stored in the first and second ENA stores 350A and 350B are synchronized, any service in the first TPCE 120A or in the second TPCE 120B has access to, and is capable of consuming all the ENAs of both the first and the second PCEs 100A and 100B.

For example, in some embodiments, a first service in the first PCE and a second service in the second TPCE 120B may be backups of each other. Since the first service and the second service both have ENAs associated with both of them, they are able to consume ENAs across TPCEs and/or PCEs. When an ENA in the first TPCE 120A fails, the first service may be able to use a corresponding ENA in the second TPCE 120B. Similarly, when an ENA in the second TPCE 120B fails, the second service may also be able to use a corresponding ENA in the first TPCE 120A.

In some embodiments, the first TPCE 120A and the second TPCE 120B may be backups of each other. When any service or ENA in the first TPCE 120A fails, a corresponding service or ENA in the second TPCE 120B may be used to replace the service or ENA in the first TPCE 120A, and vice versa.

Additionally, services for a same project can also be set up across PCEs and platforms. For example, a portion of services in the project may be provided in the first TPCE 120A, and another portion of services in the project may be provided in the second TPCE 120B. The first portion and the second portion of the services of the project may be able to consume ENAs associated with each other, even though they may reside in two different PCEs 100A and 100B and/or be hosted on two different PCEs.

In some embodiments, the data sync serverless compute service 410A or 410B may be implemented differently based on the native functions of the first and second PCEs 100A and 100B. For example, when the PCE 100A or 100B is AWS™, the data sync serverless compute service 410A or 410B may be implemented with AWS™ Lambda functions. As another example, when the PCE 100 or 100B is GCP™, the data sync serverless compute service 410A or 410B may be implemented with GOOGLE™ Cloud Functions. Regardless of what the native functions are used to implement the data sync serverless compute services 410A and 410B, they are able to perform similar functions to cause the ENAs collected in their corresponding PCEs or TPCEs to be synchronized with other PCEs or TPCEs.

Example ENA Synchronization Process

Figure 5A:
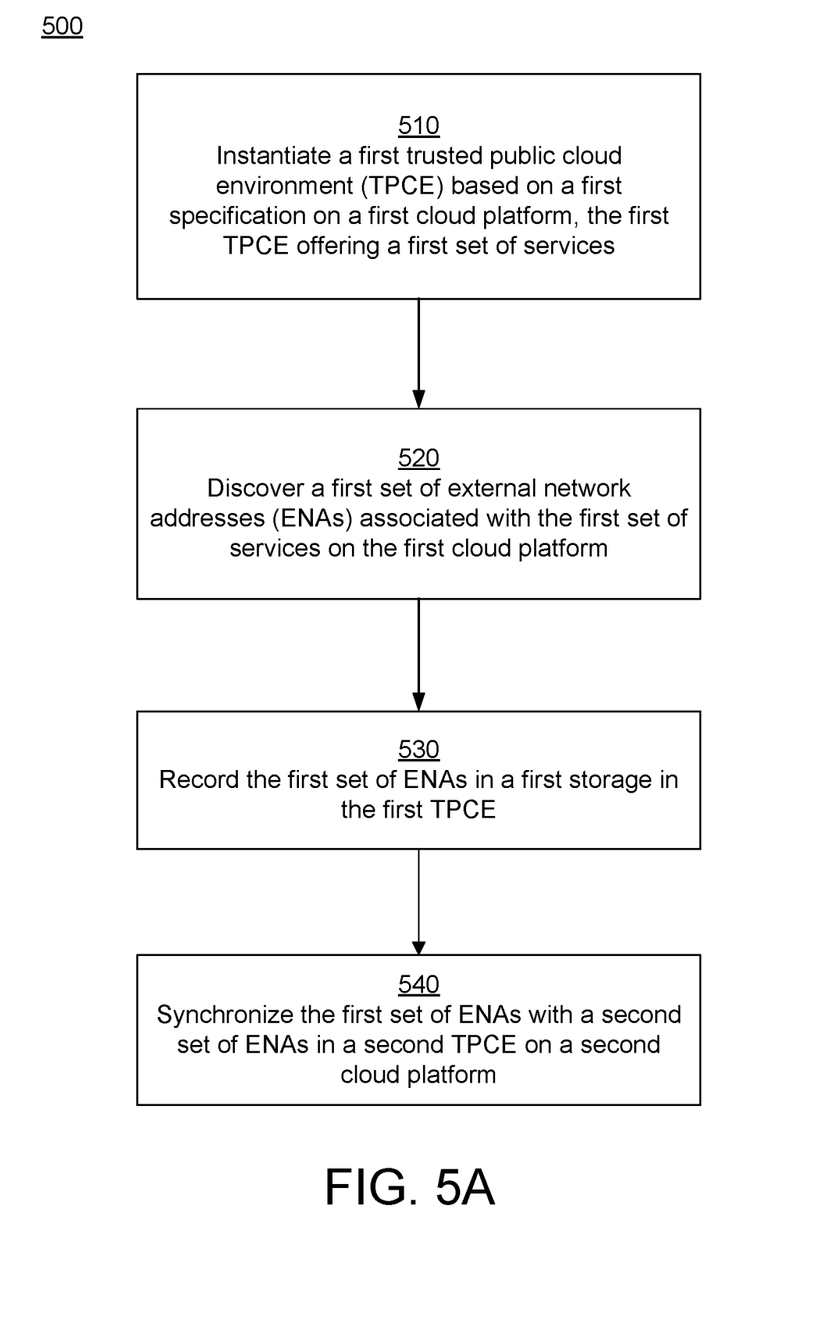
FIG. 5A is a flowchart of an example method for collecting and synchronizing ENAs across different PCEs, according to one embodiment.

FIG. 5A is a flowchart of an example method 500 for automated synchronizing ENAs across PCEs, in accordance with some embodiments. The method 500 may be implemented by computing systems, such as a first computing system associated with a first TPCE (e.g., TPCE 120A) and/or a second computing system associated with a second TPCE (e.g., TPCE 120B). A first computing system instantiates 510 a first TPCE based on a first specification in a first PCE. The first TPCE offers a first set of services. The first computing system discovers 520 a first set of external network address (ENAs) associated with the first set of services in the first PCE. In some embodiments, each ENA corresponds to an EIP. The first computing system records 530 the first set of ENAs in a first storage in the first TPCE. The first computing system synchronizes 540 the first set of ENAs with a second set of ENAs in a second TPCE on a second platform.

In some embodiments, recording 530 the first set of ENAs includes, for each ENA in the first set of ENA, recording one or more of the following datasets associated with the ENA: (1) a network address value of the ENA, (2) a name of the service associated with the ENA, (3) a functional domain in which the service associated with the ENA executes, (4) a time stamp when the ENA is associated with the service, (5) an allocation identifier associated with an allocation of the ENA, and/or (6) an association identifier associated with an association of the ENA with the service. Similarly, the second set of ENAs may also record one or more of the above datasets associated with each ENA in the second set.

In some embodiments, recording 530 the first set of ENAs includes, for each ENA in the first set of ENAs, recording the one or more datasets associated with the ENA into a pre-specified data format, and packaging the first set of the ENAs into a pre-specified data structure. In some embodiments, the pre-specified data structure is a JavaScript Object Notation (JSON) data structure. Similarly, the second set of ENAs may also be recorded and packaged into the pre-specified data structure.

The same method may be performed at a second computing system. The second computing system instantiates 510 a second TPCE in a second PCE. The second TPCE offers a second set of services. The second computing system discovers 520 a second set of ENAs associated with the second set of services. The second computing system records 530 the second set of ENAs in a second storage in the second TPCE. The first computing system and the second computing system synchronize 540 the first set of ENAs and a second set of ENAs.

Figure 5B:
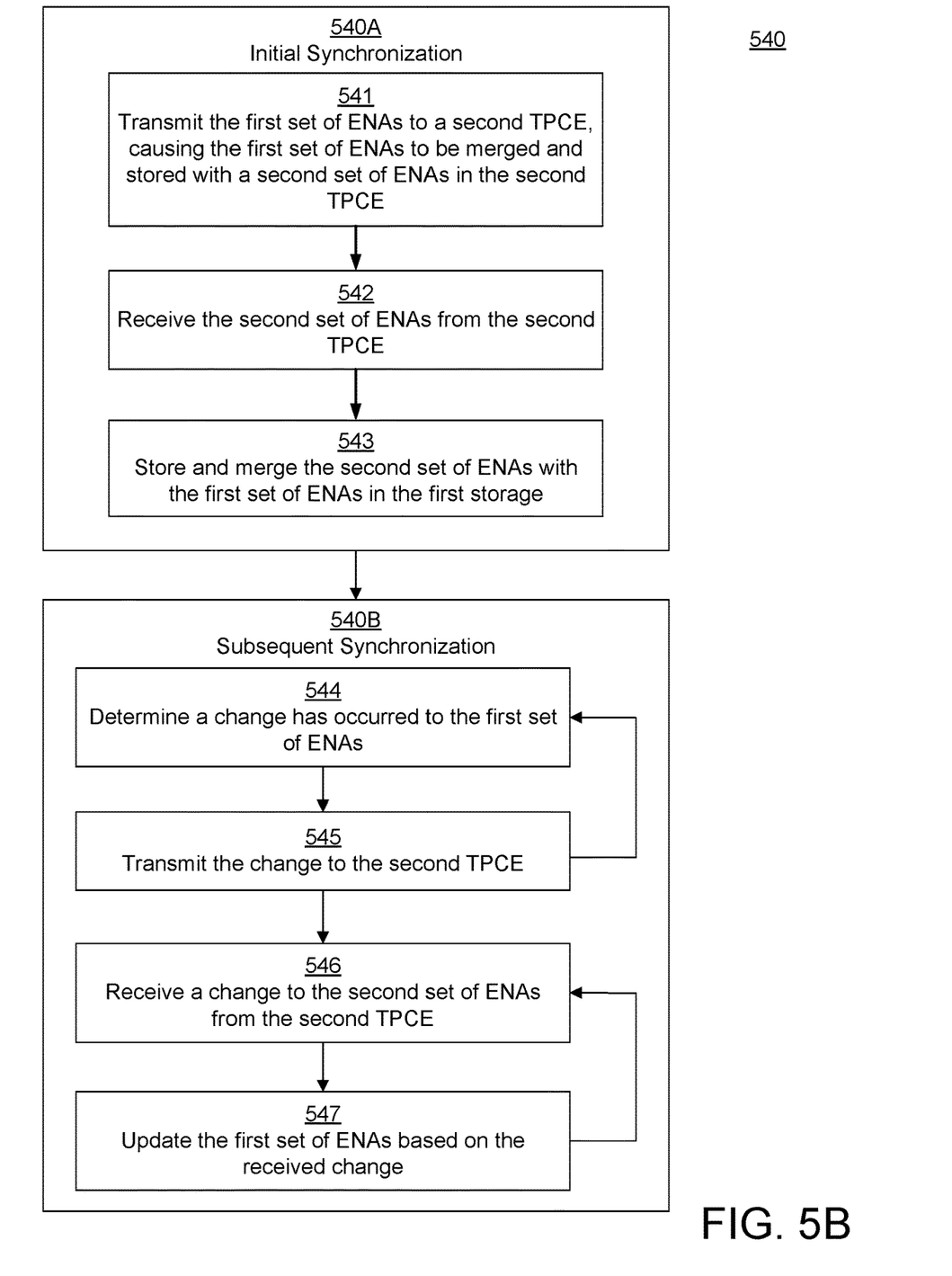
FIG. 5B is a flowchart of an example method for synchronizing ENAs across different PCEs, according to one embodiment.

FIG. 5B is a flowchart of an example method 540 of synchronizing a first set of ENAs in a first TPCE with a second set of ENAs in a second TPCE, which corresponds to the act 540 in FIG. 5A. In some embodiments, the method 540 includes an initial synchronization process 540A. During the initial synchronization process, the first computing system transmits 541 the first set of ENAs to the second TPCE, causing the first set of ENAs to be merged and stored with a second set of ENAs in the second TPCE. The first computing system also receives 542 the second set of ENAs from the second TPCE, and records and merges 543 the second set of ENAs with the first set of ENAs in the first TPCE.

In some embodiments, the method 540 also includes a subsequent synchronization process 540B. The subsequent synchronization process 540B may be an incremental synchronization process, which only synchronizes the changes made to the first set of ENAs. During such a subsequent incremental synchronization process 540B, the first computing system then monitors the first set of ENAs. When the first computing system determines 544 that a change has occurred to the first set of ENAs, it transmits 545 the change to the second TPCE. This process may repeat again and again as additional changes to the first set of ENAs occur. The first computing system also receives 546 a change to the second set of ENAs from the second TPCE, and updates 547 the first set of ENAs based on the received change. This process may also repeat again and again as additional changes are received from the second TPCE.

In some embodiments, detecting that the first set of ENAs has changed includes detecting at least one of the following in the first TPCE: (1) a creation of a new service associated with a new ENA, (2) an association of a new ENA with an existing service, (3) a deletion of an existing service associated with an existing ENA, (4) a disassociation of an existing ENA from an existing service, (5) creation of a network address translation (NAT) gateway associated with an ENA in the first TPCE, (6) a deletion of an NAT gateway associated with an existing ENA, (7) a release of an ENA in the first TPCE, (8) a creation of a virtual private network (VPN) connection, and (9) a deletion of a VPN connection in the first TPCE. Similarly, detecting that the second set of ENAs has changed may also include detecting at least one of the above in the second TPCE.

In some embodiments, synchronizing the first set of ENAs with the second set of ENAs further includes responsive to detecting a creation of a new service associated with a new ENA in the first TPCE, the first computing system adds the new ENA to the first set of ENAs stored on the first storage in the first TPCE. Responsive to adding the new ENA in the first set of ENAs stored in the first TPCE, the first computing system transmits the new ENA to the second TPCE, causing the new ENA to be added to the second set of ENAs stored in the second storage in the second TPCE.

In some embodiments, synchronizing the first set of ENAs with the second set of ENAs further includes, responsive to detecting a deletion of an existing service associated with an existing ENA in the first TPCE, the first computing system deletes the existing ENA from the first set of ENAs stored in the first storage in the first TPCE. Responsive to deleting the existing ENA from the first set of ENAs stored in the first storage in the first TPCE, the first computing system transmits the deletion of the existing ENA to the second TPCE, causing the existing ENA to be deleted from the second set of ENAs stored in the second storage in the second TPCE.

In some embodiments, synchronizing the first set of ENAs with the second set of ENAs further includes, responsive to detecting an association of a new ENA with an existing service associated with an existing ENA in the first TPCE, the first computing system replaces the existing ENA with the new ENA in the first set of ENAs stored in the first storage in the first TPCE. Responsive to replacing the existing ENA in the first set of ENAs stored in the first TPCE with the new ENA, the first computing system transmits the new ENA to the second TPCE, causing the existing ENA in the second set of ENAs stored in the second storage in the second TPCE to be replaced with the new ENA.

Similarly, synchronizing the second set of ENAs with the first set of ENAs may be performed by the second computing system associated with the second PCE.

In some embodiments, the first computing system publishes the first set of ENAs, such that services in the first TPCE have access to the first set of ENAs. Similarly, the second computing system publishes the second set of ENAs, such that services in the second TPCE have access to the second set of ENAs. Since the first and second sets of ENAs are synchronized, any services in the first TPCE or second TPCE would have access to ENAs associated with services in both the first TPCE and the second TPCE.

In some embodiments, synchronization the first set of ENA with the second set of ENA is performed via a NAT gateway and a serverless computing service implemented in the first TPCE. In some embodiments, the serverless computing service is configured to cause the NAT gateway to transmit the first set of NAEs or changes thereof to the second TPCE. Similarly, a NAT gateway and a serverless computing service may also be implemented in the second TPCE configured to transmit the second set of NAEs or changes thereof to the first TPCE.

Note, various embodiments can perform the steps of FIG. 5A or 5B in different orders than those indicated herein. Moreover, other embodiments can include different and/or additional steps than the ones described herein.

Computer Architecture

Figure 6:
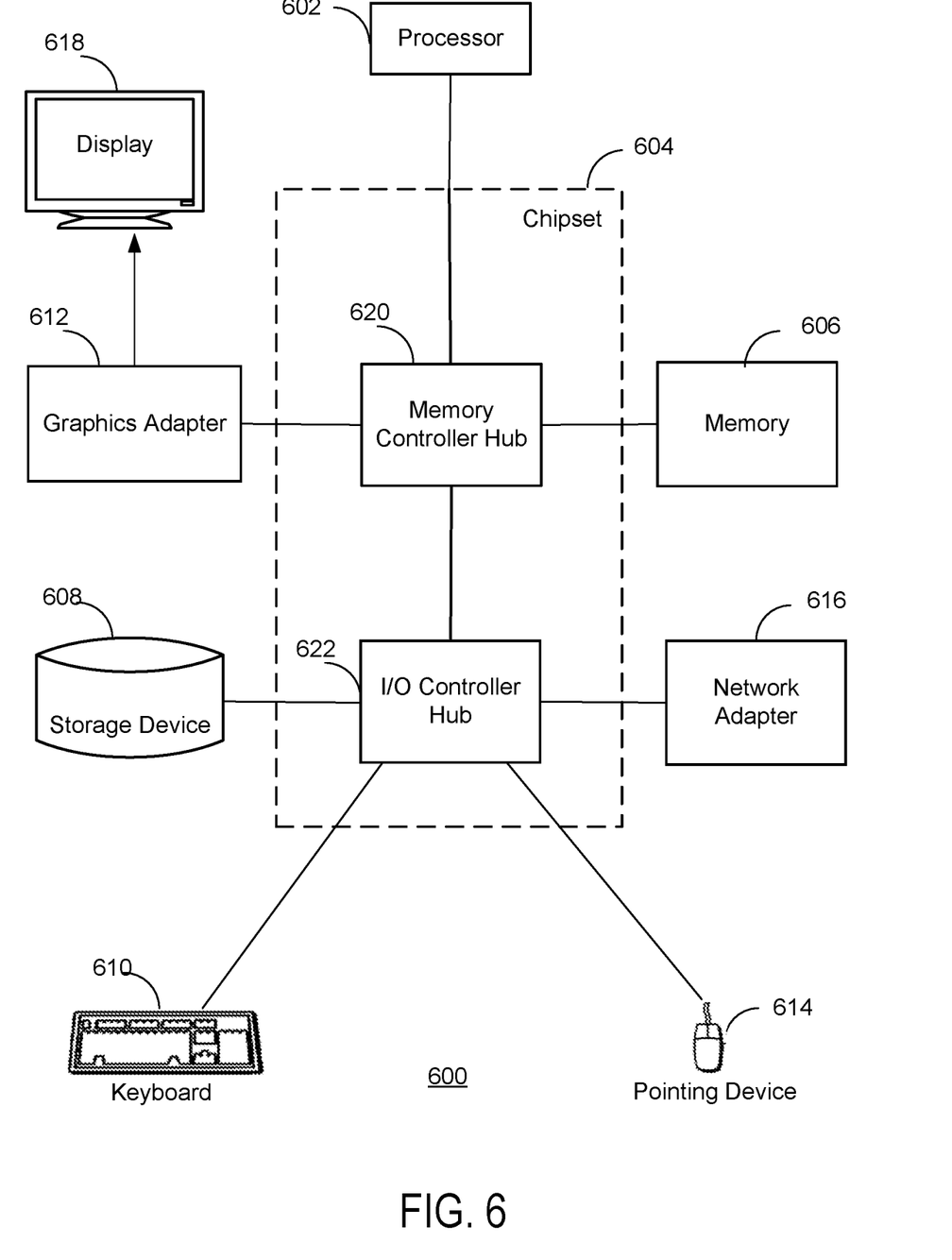
FIG. 6 is a block diagram illustrating the architecture of a typical computer system for use in the environment of FIG. 3 according to one embodiment.

FIG. 6 is a block diagram illustrating the architecture of a typical computer system 600 for use in the environments of FIG. 3 according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to a network.

As is known in the art, a computer system 600 can have different and/or other components than those shown in FIG. 6. In addition, the computer system 600 can lack certain illustrated components. For example, a computer system 600 acting as an online system 300 may lack a keyboard 610 and a pointing device 614. Moreover, the storage device 608 can be local and/or remote from the computer 600 (such as embodied within a storage area network (SAN)).

The computer system 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the system of FIG. 3 can vary depending upon the embodiment and the processing power used by the entity. For example, a client device may be a mobile phone with limited processing power, a small display 618, and may lack a pointing device 614. The online system 300 in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

We claim:

1. A computer-implemented method for automated network address synchronization in a multi-cloud environment, the method comprising:
   instantiating a first trusted public cloud environment (TPCE) based on a first specification in a first PCE, the first TPCE offering a first set of services;
   discovering a first set of external network addresses (ENAs) associated with the first set of services in the first TPCE;
   recording the first set of ENAs in a first storage in the first TPCE;
   synchronizing the first set of ENAs with a second set of ENAs associated with a second set of services in a second TPCE in a second PCE, causing the first set of services in the first TPCE and the second set of services in the second TPCE to have access to both ENAs associated with the first set of services in the first TPCE and ENAs associated with the second set of services in the second TPCE; and
   causing the second TPCE to merge and store the first set of ENAs with the second set of ENAs in the second storage in the second TPCE.

2. The computer-implemented method of claim 1, wherein the second TPCE is instantiated based on a second specification in the second PCE, wherein the second TPCE offers the second set of services, and wherein the second set of ENAs associated with the second set of services are discovered and recorded in a second storage in the second TPCE.

3. The computer-implemented method of claim 1, the synchronizing the first set of ENAs with the second set of ENAs comprising:
   transmitting the first set of ENAs to the second TPCE;
   receiving the second set of ENAs from the second TPCE; and
   storing and merging the second set of ENAs with the first set of ENAs in the first storage in the first TPCE.

4. The computer-implemented method of claim 1, the synchronizing the first set of ENAs with the second set of ENAs comprising:
   monitoring the first set of ENAs to detect changes; and
   responsive to detecting a change to the first set of ENAs, transmitting the change to the second TPCE, causing the second set of ENAs to be updated based on the change, such that the change made to the first set of ENAs is also made to the second set of ENAs.

5. The computer-implemented method of claim 4, the detecting that the first set of ENAs has changed comprising detecting at least one of the following:
   a creation of a new service associated with a new ENA in the first TPCE;
   an association of a new ENA with an existing service in the first TPCE;
   a deletion of an existing service associated with an existing ENA in the first TPCE;
   a disassociation of an existing ENA from an existing service in the first TPCE;
   a creation of a network address translation (NAT) gateway associated with an ENA in the first TPCE;
   a deletion of an NAT gateway associated with an existing ENA in the first TPCE;
   a release of an ENA in the first TPCE;
   a creation of a virtual private network (VPN) connection in the first TPCE; and
   a deletion of a VPN connection in the first TPCE.

6. The computer-implemented method of claim 5, the synchronizing the first set of ENAs with the second set of ENAs comprising:
   responsive to detecting a creation of a new service associated with a new ENA in the first TPCE,
     adding the new ENA to the first set of ENAs stored in the first storage in the first TPCE; and
     responsive to adding the new ENA in the first set of ENAs stored in the first TPCE, transmitting the new ENA to the second TPCE, causing the new ENA to be added to the second set of ENAs stored in the second storage in the second TPCE.

7. The computer-implemented method of claim 5, the synchronizing the first set of ENAs with the second set of ENAs comprising:
   responsive to detecting a deletion of an existing service associated with an existing ENA in the first TPCE,
   deleting the existing ENA from the first set of ENAs stored in the first storage in the first TPCE; and
   responsive to deleting the existing ENA from the first set of ENAs stored in the first storage in the first TPCE, transmitting the deletion of the existing ENA to the second TPCE, causing the existing ENA to be deleted from the second set of ENAs stored in the second storage in the second TPCE.

8. The computer-implemented method of claim 5, the synchronizing the first set of ENAs with the second set of ENAs comprising:
responsive to detecting an association of a new ENA with an existing service associated with an existing ENA in the first TPCE,
replacing the existing ENA with the new ENA in the first set of ENAs stored in the first storage in the first TPCE; and
responsive to replacing the existing ENA in the first set of ENAs stored in the first TPCE with the new ENA, transmitting the new ENA to the second TPCE, causing the existing ENA in the second set of ENAs stored on in the second storage in the second TPCE to be replaced with the new ENA.

9. The computer-implemented method of claim 1, further comprising:
publishing the first set of ENAs, such that services in the first TPCE have access to the first set of ENAs.

10. The computer-implemented method of claim 1, wherein recording the first set of ENAs includes for each ENA in the first set of ENAs, recording one or more of the following datasets associated with the ENA:
a network address value of the ENA;
a name of the service associated with the ENA;
a functional domain in which the service associated with the ENA executes;
a time stamp when the ENA is associated with the service;
an allocation identifier associated with an allocation of the ENA; or
an association identifier associated with an association of the ENA with the service.

11. The computer-implemented method of claim 10, wherein recording the first set of ENAs includes, for each ENA in the first set of ENAs, recording the one or more datasets associated with the ENA into a pre-specified data format; and packaging the first of ENAs into a pre-specified data structure.

12. The computer-implemented method of claim 11, wherein the pre-specified data structure is a JavaScript Object Notation (JSON) data structure.

13. The computer-implemented method of claim 1, wherein each ENA in the first set of ENAs includes an external IP address (EIP).

14. The computer-implemented method of claim 1, wherein synchronizing the first set of ENAs with the second set of ENAs is performed via a network address translation (NAT) gateway and a serverless computing service implemented in the first TPCE.

15. The computer-implemented method of claim 14, wherein the serverless computing service is configured to cause the NAT gateway to transmit the first set of ENAs or changes thereof to the second TPCE.

16. A non-transitory computer-readable medium, storing computer-executable instructions thereon, that when executed by a processor of a computer system, cause the computer system to perform the following:
instantiate a first trusted public cloud environment (TPCE) based on a first specification in a first PCE, the first TPCE offering a first set of services;
discover a first set of external network addresses (ENAs) associated with the first set of services in the first TPCE;
record the first set of ENAs in a first storage in the first TPCE;
synchronize the first set of ENAs with a second set of ENAs associated with a second set of services in a second TPCE in a second PCE, causing the first set of services in the first TPCE and the second set of services in the second TPCE to have access to both ENAs associated with the first set of services in the first TPCE and ENAs associated with the second set of services in the second TPCE; and
cause the second TPCE to merge and store the first set of ENAs with the second set of ENAs in the second storage in the second TPCE.

17. The non-transitory computer-readable medium of claim 16, the synchronizing the first set of ENAs with the second set of ENAs comprising:
transmitting the first set of ENAs to the second TPCE;
receiving the second set of ENAs from the second TPCE; and
storing and merging the second set of ENAs with the first set of ENAs in the first storage in the first TPCE.

18. The non-transitory computer-readable medium of claim 16, the synchronizing the first set of ENAs with the second set of ENAs comprising:
monitoring the first set of ENAs to detect changes; and
responsive to detecting a change to the first set of ENAs, transmitting the change to the second TPCE, causing the second set of ENAs to be updated based on the change, such that the change made to the first set of ENAs is also made to the second set of ENAs.

19. The non-transitory computer-readable medium of claim 18, the detecting that the first set of ENAs has changed comprising detecting at least one of the following:
a creation of a new service associated with a new ENA in the first TPCE;
an association of a new ENA with an existing service in the first TPCE;
a deletion of an existing service associated with an existing ENA in the first TPCE;
a disassociation of an existing ENA from an existing service in the first TPCE;
a creation of a network address translation (NAT) gateway associated with an ENA in the first TPCE;
a deletion of an NAT gateway associated with an existing ENA in the first TPCE;
a release of an ENA in the first TPCE;
a creation of a virtual private network (VPN) connection in the first TPCE; and
a deletion of a VPN connection in the first TPCE.

20. A computer system comprising:
a processor; and
a non-transitory computer readable storage medium, storing computer-executable instructions thereon, that when executed by the processor, cause the processor to perform the following:
instantiate a first trusted public cloud environment (TPCE) based on a first specification in a first PCE, the first TPCE offering a first set of services;
discover a first set of external network addresses (ENAs) associated with the first set of services in the first TPCE;
record the first set of ENAs in a first storage in the first TPCE;
synchronize the first set of ENAs with a second set of ENAs associated with a second set of services in a second TPCE in a second PCE, causing the first set of services in the first TPCE and the second set of services in the second TPCE to have access to both ENAs associated with the first set of services in the first TPCE and ENAs associated with the second set of services in the second TPCE; and cause the second TPCE to merge and store the first set of ENAs with the second set of ENAs in the second storage in the second TPCE.

* * * * *